United States Patent [19]

Beuhler et al.

[11] Patent Number: 5,317,082

[45] Date of Patent: May 31, 1994

[54] PHOTODEFINABLE OPTICAL WAVEGUIDES

[75] Inventors: Allyson J. Beuhler, Downers Grove; David A. Wargowski, Naperville, both of Ill.

[73] Assignee: Amoco Corporation, Chicago, Ill.

[21] Appl. No.: 994,637

[22] Filed: Dec. 22, 1992

[51] Int. Cl.$^5$ .................. C08G 73/10; G02B 1/04; G02B 6/16

[52] U.S. Cl. ................... 528/353; 528/171; 528/173; 528/183; 528/185; 528/188; 528/220; 528/229; 528/351; 385/123; 385/129; 385/142; 385/143; 385/144; 385/145

[58] Field of Search .............. 528/353, 220, 229, 171, 528/173, 183, 188, 185, 351; 385/142, 143, 123, 129, 144, 145

[56] References Cited

U.S. PATENT DOCUMENTS

| | | | |
|---|---|---|---|
| 4,595,548 | 6/1986 | St. Clair et al. | 264/236 |
| 4,603,061 | 7/1986 | St. Clair et al. | 427/162 |
| 4,657,832 | 4/1987 | Pfeifer | 430/18 |
| 4,705,540 | 11/1987 | Hayes | 55/16 |
| 4,717,393 | 1/1988 | Hayes | 55/16 |
| 4,912,197 | 3/1990 | Hayes | 528/353 |

FOREIGN PATENT DOCUMENTS 0454590  4/1991  European Pat. Off. ............... 73/10

OTHER PUBLICATIONS

A. K. St. Clair and W. S. Slemp, NASA LAR-13539 "Evaluation of Colorless Polyimide Film for Thermal Control Coating Applications".

E. S. Moyer, Thesis Virginia Polytech Institute, 1989, "Photocrosslinkable Polyimide and Poly(imide Siloxane) Homo and Copolymers: Synthesis and Characterization" (pp. 119–120, 164–169).

*Primary Examiner*—Morton Foelak
*Assistant Examiner*—P. Hampton-Hightower
*Attorney, Agent, or Firm*—Rae K. Stuhlmacher; Mary Jo Kanady; Wallace L. Oliver

[57] ABSTRACT

Polyimide optical waveguide structures comprising a core within a cladding wherein at least one of the core and the cladding is a polyimide containing 6FDA, BTDA, an aromatic diamine having bulky methyl groups ortho to the amine, and a co-diamine wherein the polyimides have the properties of low optical loss, low optical absorbance, controllable refractive index, and high thermal stability, and wherein the polyimides are photosensitive and solvent resistant.

14 Claims, No Drawings

PHOTODEFINABLE OPTICAL WAVEGUIDES

FIELD OF THE INVENTION

This invention relates to polyimide optical waveguide structures. Specifically, this invention relates to waveguides made from polyimide compositions containing 6FDA, BTDA, an aromatic diamine having bulky methyl groups ortho to the amine, and a co-diamine wherein the polyimides have the properties of low optical loss, low optical absorbance, controllable refractive index, and high thermal stability, and wherein the polyimides are photosensitive and solvent resistant.

BACKGROUND OF THE INVENTION

The speed at which electrical signals can travel limits the speed at which data can be transferred. One solution is to convert the transfer of signals from the transfer of electrons to the transfer of photons which are capable of carrying high speed, high data rate computing signals (hundreds of MHz to GHz frequencies). These interconnects may be chip-to-chip, as in an optical multichip module, or connect single packaged chips on a printed circuit board.

Optical data transfer can be accomplished by an optical waveguide having a transparent "optical" core guiding material that is embedded in a cladding material. The optical signal is transmitted through the core material via total internal reflection. Optical waveguides are used at the printed circuit board level for clock distribution and interconnection of single chip packages and on silicon substrates for interchip connection at the multichip module level.

One requirement for the cladding material is that the refractive index of the cladding material be less than the refractive index of the core material. For passive guides, the cladding could be air, but polymer claddings are typically preferred so that the core material is isolated from any conducting (metallization) layers.

Useful optical waveguides must have low optical transmission loss, low optical absorbance, and controllable refractive index.

Another useful property is high thermal stability, which is necessary so that the waveguide will survive electronic packaging and assembly processes used in manufacturing. The optical multichip module would have to survive semiconductor assembly processes such as die attach, metallization, and wire bonding. The printed circuit board would have to survive reflow soldering and rework.

A particularly useful property is that either the core or the cladding materials can be photodefined into channels or ridges with smooth sidewalls using UV exposure techniques.

Still another useful property is that multilayer structures can be formed by overcoating one polymer layer over another. In other words, the first layer of the multilayer structure would be resistant to the solvent used in the subsequent "overcoat" layer.

Polymethylmethacrylate (PMMA) is one photodefinable polymer that has been used for optical waveguides. However, PMMA has low thermal stability and cannot be used at the high temperatures needed for most electronic applications, for example, greater than 300° C. needed for die attach and soldering procedures used in the manufacturing of printed circuit boards.

Photodefinable polyimides are typically not used as waveguides because many conventional photodefinable polyimides are not transparent. Further, although polyimides are known to have the thermal stability required for electronic and semiconductor applications, many semiconductor grade polyimides display a high optical absorbance in the near IR visible region. Since typical commercial laser and light sources emit in the near IR visible range (350 nm to 2,000 nm) a polymer having a high optical absorbance in this region is generally not desirable for use as a photodefinable waveguide.

EP 454,590 discusses low optical loss waveguides that are made from isotropic polyimides. The reference teaches that 2,2'-bis(trifluoromethyl)-4,4'-diaminobiphenyl is a necessary component of the invention. However, the polymers are not photosensitive. Further, an extensive multilayer resist process and an extensive dry etching process is taught in the examples as necessary to pattern these polymers.

Further, the European reference lists BTDA, among many dianhydrides, as one possible component of their waveguides. However, there are no examples teaching the use of BTDA and there is no recognition that BTDA must be carefully balanced to provide a useful photosensitive material for use as a waveguide. BTDA has a very strong absorbance maximum at 310 nm to 330 nm. Therefore, polyimide compositions incorporating large amounts of BTDA would be expected to have a very high optical absorbance loss, a property which is not preferred in an optical waveguide.

The EP 454,590 reference also teaches that the homopolyimides of their invention cannot be multilayered unless the first layer has been heat treated (cured) at a temperature of not less than 380° C. This high temperature heat treatment is probably necessary because highly fluorinated polyimides are known to have a low solvent resistance. The polyimides of the present invention, however, are copolyimides that are photosensitive and that can be photochemically crosslinked. Crosslinking is believed to improve solvent resistance so that the polyimides of the present invention can be multilayered after a cure temperature of only 350° C.

U.S. Pat. No. 4,912,197 discloses 6FDA/BTDA/DMDE polyimides. The polyimides are highly soluble, clear compositions that are photochemically crosslinkable. The reference does not address photosensitivity or photodefinability. However, the 6FDA/BTDA/DMDE polyimides have a high birefringence which causes them to scatter light (see Comparative Examples A–C).

The polyimides of the present invention provide a photodefinable polyimide that incorporates a co-diamine moiety which contributes to reduced birefringence. Birefringence is a measure of the optical anisotropy (i.e., wherein the properties are different in one direction, for example in-plane, than they are in another direction, for example, out-of-plane). The typical rigid rod polyimides that are generally preferred for semiconductor applications are highly oriented in the plane of the coating and thus exhibit a high birefringence. High birefringence measurements correspond to high optical scattering losses and irreproducibility of the refractive index.

Further, it is unexpected that the incorporation of a non-photocrosslinkable co-diamine in the polyimide of the present invention would result in a polyimide having high photosensitivity since the introduction of a co-diamine should reduce the concentration of the photocrosslinkable group in DMDE.

Moyer, E., PhD Thesis, Virginia Polytech Institute, 1989, (page 168) found that the reduction of the methyl substituted diamines greatly decreased photosensitivity. When Moyer replaced DMDE with 40 mol % of a co-diamine 1,3-bis(3-aminophenoxy-4'-benzoyl) benzene (DKEDA), his photosensitivity dropped from 188 mJ/cm$^2$ to 1,388 mJ/cm$^2$. However, we have discovered that certain co-diamines will provide a polyimide having reduced birefringence and that still retains high photosensitivity.

U.S. Pat. No. 4,657,832 discloses photosensitive polyimides where the diamine is substituted with alkyl groups but the disclosed polyimides do not encompass the use of the 6F dianhydride. Further, this reference does not teach the use of a co-diamine to reduce birefringence in the polyimide.

NASA Technical Support Package LAR-13539 and U.S. Pat. Nos. 4,595,548 and 4,603,061 disclose transparent aromatic polyimides derived from various dianhydrides, including 6FDA, and ether or thioether bridged diamines. However, these compositions are not photosensitive. Furthermore, the NASA Package teaches the use of aryl ether diamines such as OBA and BDAF to reduce charge transfer complexes and increase transparency. We have shown that OBA and BDAF containing polyimides are not sufficiently photosensitive for use in the waveguides of the present invention (see Comparative Examples D and F).

U.S. Pat. No. 4,705,540 discloses the use of 6FDA/DMDE as a gas permeable membrane. The disclosed compositions do not include BTDA and are not photosensitive. Also, this reference teaches the use of rigid diamines and co-diamines with hindered rotation. The rigid diamines would be expected to increase birefringence making the polymer unsuitable for waveguides.

U.S. Pat. No. 4,717,393 discloses auto-photochemically crosslinked gas separation membranes. The reference does not teach the use of a co-diamine to decrease optical loss.

The present invention provides an optical waveguide made from a thermally stable, low optical loss, low optical absorbance polyimide. The refractive index of the polyimides of the present invention can be controlled by changing the composition of the polyimide (for example, compare Example 1 to Example 7) or by substituting one co-diamine for another (compare Example 1 to Example 3).

The polyimides of the present invention are photosensitive and can be photodefined which affords their fabrication into the waveguide structures of the present invention by UV exposure. Further, the polyimides of the present invention can be etched or channeled by wet etch techniques.

The polyimides of the present invention are solvent resistant and can be fabricated into multilayer structures by overcoating one polyimide layer over another.

In addition, we have found that fluorinated co-diamines reduce absorbance at 1.3 microns, an important wavelength for telecommunications. Therefore, in the present invention, fluorinated co-diamines are preferred.

SUMMARY OF THE INVENTION

The present invention provides a photodefinable optical waveguide comprising a core material within a cladding material wherein at least one of the core material and the cladding material comprises a copolyimide having the repeating units I and II

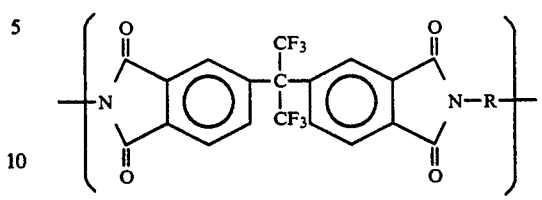

and from about 0.1 mole % to about 30 mole %

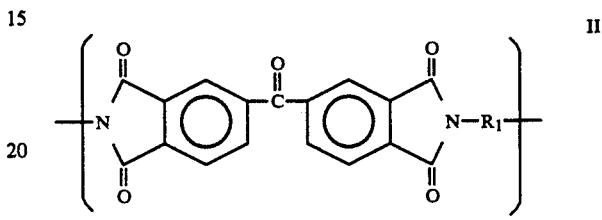

wherein R and $R_1$ are selected from a group consisting of at least one of an aromatic diamine moiety having bulky methyl groups ortho to the amine, and a co-diamine moiety; or the polyamic acid, salts, or polyester precursors therefor; wherein the photosensitivity of the polyimide is less than about 1,000 mJ/cm$^2$, the birefringence is from about $-0.25$ to about $+0.25$, and wherein the refractive index of the core is greater than the cladding.

The present invention includes the salt, carboxylic acid, or ester precursors of the polyimide of the present invention. The present invention also includes compositions which have the polyimides of the present invention in combination with the polyamic acid, salt, or ester precursors of the polyimide.

The optical waveguides of the present invention include many types of waveguide structures, for example, fiber type, parallel surface type, ridge type, channel type, lens type, and embedded type optical waveguides.

BRIEF DESCRIPTION OF THE INVENTION

The polyimides of the present invention can be prepared as the polycondensation product of components comprising 6FDA, BTDA, a diamine, and a co-diamine.

The following abbreviations as used herein are defined as follows:

| ABBRE-VIATION | FULL NAME |
|---|---|
| 6FDA | 2,2-bis(3,4-dicarboxyphenyl)-hexafluoropropane dianhydride |
| ABL-21 | 2,2'-bis(trifluoromethyl)benzidine |
| APBP | 4,4'-bis(4-aminophenoxy)biphenyl |
| APES | 3-aminopropyl triethoxysilane |
| BAAF | 2,2'-bis(4-aminophenyl)hexafluoropropane |
| 124-OBABTF | 4,4'-oxy-bis{3-(trifluoromethyl)benzenamine} |
| BDAF | 2,2'-bis(4-(4-aminophenoxy)phenyl)-hexafluoropropane |
| BTDA | 3,3',4,4'-benzophenone tetracarboxylic acid dianhydride |
| DABF | 3,5 diamino benzotrifluoride |
| DMDE | diaminodurene or 2,3,5,6-tetramethyl-1,4-phenylene diamine |
| FAPB | 4,4'-((1,1'-biphenyl)-4,4'-diybis(oxy))bis-3-(trifluoromethyl) |
| GBL | gamma-butyrolactone |

| ABBRE-VIATION | FULL NAME |
|---|---|
| MEDA | 2,4,6-trimethyl-1,3-phenylenediamine |
| NMP | N-methylpyrrolidone |
| OBA | 4,4'-dioxyaniline |
| PMDA | pyromellitic acid dianhydride |
| TBM | 3,3',5,5'-tetramethylbenzidine |

Suitable aromatic diamines having bulky methyl groups ortho to the amine include, for example,

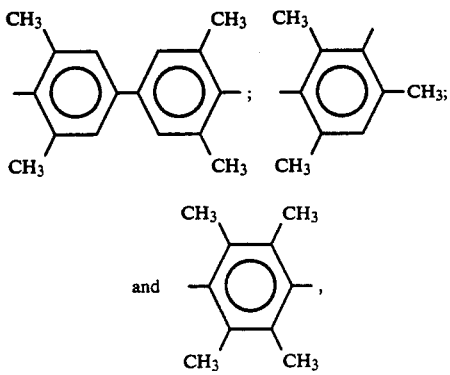

which are moieties of TMB, MEDA, and DMDE, respectively.

Suitable co-diamines are those co-diamines that disrupt in-plane packing and orientation and provide a low birefringence and high photosensitivity to the polyimide. Such co-diamines include, for example, bis(trifluoromethyl)phenylenediamine, diaminotetra(trifluoromethyl)benzene, diamino(pentafluoroethyl)benzene, 2,5-diamino(perfluorohexyl)benzene, 2,5-diamino(perfluorobutyl)-benzene; benzidine, 3,3'-bis(trifluoromethyl)-4,4'-diaminobiphenyl, octafluorobenzidine, 1,2-bis(anilino)ethane, 2,2'-bis(p-aminophenyl)-hexafluoropropane, 1,3-bis(anilino)hexafluoropropane, 1,4-bis(anilino)octafluorobutane, 1,5-bis(anilino)decafluoropentane, 1,7-bis(anilino)tetradecafluoroheptane, 2,2-bis(3-amino-4-methylphenyl)-hexafluoropropane, BAAF, ABL-21, DABF, and the like. Particularly preferred co-diamines are those that are substituted with fluorine groups, for example, ABL-21, BAAF, and the like.

Using conventional lithography equipment, the photosensitivity measurement must be less than 1,000 mJ/cm$^2$ (approximately 2 micron thick coating) for the polyimide to be photodefinable for practical use. Photosensitivity measurements less than 300 mJ/cm$^2$ are preferred because they provide a lithographically useful image at lower exposure dose. Photosensitivity measurements higher than 1,000 mJ/cm$^2$ would require very long exposure times that are not attainable with commercial equipment. We also found that poor images, or no images, were obtained when the photosensitivity measurements exceeded this value.

Generally, polyimides are made by mixing a diamine component and a dianhydride component and adding a compatible solvent to form a solution of polyamic acid. The polyamic acid is then imidized by either chemical or thermal methods to form a polyimide, and the polyimide is isolated.

A composition of the polyimide of the present invention in solution solvent is spread on a substrate to form a coating. Multiple layers of polyimide are used to form a structure having multiple layers of waveguides.

The structure of the optical waveguide of the present invention has at least one layer comprising a core guiding material which is situated within a cladding material. Multiple layers of waveguides can be fabricated onto a single printed circuit board. The polyimide of the present invention is useful in the optical waveguide as (1) a core material; (2) a cladding material; or (3) both the core material and the cladding material, so long as the core material has a higher refractive index than the cladding material. Further, the refractive index of the polyimides of the present invention can be controlled by changing the composition of the polyimide (for example, compare Example 1 to Example 7) or by substituting one co-diamine for another (compare Example 1 to Example 3).

In other words, the core material can be a material, for example, polymer, glass, $SiO_2$, silicone gel, epoxy, and the like. In that case, a polyimide of the present invention which has a lower refractive index than the core material can be the cladding. On the other hand, the core material can be the polyimide of the present invention, and the cladding material can be a different material having a lower refractive index, for example, polymers, air, vacuum, glass, silicone gel, epoxy, PMMA, $SiO_2$, and the like. Alternatively, both the core and the cladding materials can be the polyimide of the present invention wherein the core has a higher refractive index than the cladding.

The polyimides of the present invention can also be doped with electro-optic or non-linear optical chromophores using a guest/host approach, i.e., the polyimide serves as an inert matrix for an active dopant. The effect of the dopant is twofold. The dopant increases the refractive index so that selective waveguiding takes place, i.e., the doped areas guide and the undoped areas serve as the cladding. In addition, the dopant adds electro-optic or non-linear optical activity so that the doped polymers response to an electro-magnetic field is second order or non-linear. These types of guest/host doped polymers are known to those skilled in the art and are used in the construction of light modulators and electro-optic switches. Examples of electro-optic dopants are Disperse Red 1, Eriochrome Black T, Erythrosin, and p-nitro-aniline.

In greater detail, the dianhydride component and diamine component typically are allowed to react in the presence of polar aprotic solvent to provide a polyamic acid solution. The stoichiometric ratio of the total diamine and the total dianhydride concentrations of the polymer ranges from about a 2 mole % excess anhydride to about a 1:1 stoichiometric ratio, preferred is 0.5 mole % excess. For example, a total dianhydride component made up of BTDA and 6FDA can range from about 5 mol % to about 10 mol % BTDA.

The condensation reaction takes place at approximately room (ambient) temperature to form a polyamic acid. Preferably, the reaction takes place at less than 30° C. in 3 hours to several days, more preferably between 5 to 24 hours.

The polyamic acid is then imidized using thermal or chemical means. Thermal imidization is typically carried out in the solution solvent at a temperature range typically from about 50° C. to about 300° C., preferably from about 120° C. to about 180° C., most preferably at about 150° C. Chemical imidization is generally accomplished using dehydrating agents, such as, for example, acetic anhydride or trifluoro-acetic anhydride. Other examples of suitable dehydrating agents can be found in Bessonov, M. I. et al., Polyimides-Thermally Stable Polymers, Consultants Bureau, New York, 76–82 (1987), incorporated herein by reference. A particularly suitable chemical imidization composition is the dehydrating agent, acetic anhydride, used in the presence of a catalyst such as pyridine. Also preferred are 1,3-dicyclohexylcarbodiimide (DCC), thionyl chloride, phosphorous trichloride, trifluoroacetic anhydride, and the like.

A solid polymer can be isolated from solution by precipitating the polymeric solution in low-polarity solvents, such as for example, alkanes such as pentane, hexane, heptane; alcohols such as methanol, ethanol, propanol; ethers such as diethyl ether, and the like. Preferably, the polymer is precipitated with methyl alcohol, washed with solvent, and dried in air or inert atmosphere (such as nitrogen).

Generally, the polyimide solution will be diluted with a solution solvent, such as gamma-butyrolactone (GBL), based on the thickness requirement of the final coating, the viscosity and solids content of the solution, and the spin curve data for the polymer. Typically, solutions of the polyimide are applied to the substrate with solids concentrations from about 1 to about 60 weight percent and preferably from about 5 to about 40 weight percent. The spin curve data can be obtained by spin-coating the polymer onto the substrate at various spin speeds, measuring the resulting thickness and plotting thickness versus spin speed. Clean, dry, high-purity solvent (solution solvent) is generally used as the diluent. The diluted solution is generally pressure-filtered to a pore size from about 2 microns to about 0.1 microns before further processing.

Examples of suitable solution solvents are polar aprotic solvents which can be used by themselves or in mixtures of two or more solvents. Suitable solution solvents are, for example, ethers such as dibutyl ether, tetrahydrofuran, dioxane, methylene glycol, dimethylethylene glycol, dimethyldiethylene glycol, diethyldiethylene glycol and dimethyltriethylene glycol; halogenated hydrocarbons such as chloroform, dichloromethylene, 1,2-dichloroethane, 1,1,1-trichloroethane and 1,1,2,2-tetrachloroethane; carboxylic acid esters and lactones such as ethyl acetate, methyl propionate, ethyl benzoate, 2-methoxyethyl acetate, p-valerolactone, gamma-butyrolactone, and pivalolactone; ketones such as acetone, cyclopentanone, cyclohexanone, methyl ethyl ketone; carboxylic acid amides and lactams such as formamide, acetamide, N-methylformamide, N,N-diethylformamide, N,N-diethylacetamide, gamma-butyrolactam, epsilon-caprolactam, N-methylcaprolactam, N-acetylpyrrolidone, N-methylpyrrolidone, tetramethylurea and hexamethylphosphoric acid amide; sulfoxides such as dimethylsulfoxide; sulfones such as dimethyl sulfone, diethyl sulfone, trimethylene sulfone, tetramethylene sulfone, trimethylamine sulfone, and tetramethylene sulfone; amines such as trimethylamine, triethylamine, N-methylpiperidine, N-methylmorpholine; and substituted benzenes such as chlorobenzene, nitrobenzene, phenols, cresols, and the like. Preferred solution solvents are those that generally have high boiling points, such as, for example, NMP, dimethylacetamide, diglyme, gamma-butyrolactone, N-methylformamide.

In this case, the polyimide solution can be applied either statically or dynamically. In static application, the polyimide solution is dispensed to a nonrotating substrate and spread across the surface by spinning. In dynamic application, the polyimide solution is dispensed to a rotating substrate. In either case, the substrate is spun at a spin speed which is determined from the spin curve for the final coating thickness required.

Whichever application method is used, the substrate is then spun at a spin speed determined from spin curve data which is calculated to achieve the final coating thickness required. The coating is typically, between about 1 and about 30 microns in thickness.

Alternatively, the photoimageable polyimide coating can be applied to suitable carriers, or substrates, by other conventional methods, which can include, but are not necessarily limited to, dipping, brushing, casting with a bar, roller-coating, spray-coating, dip-coating, whirler-coating, cascade-coating, curtain-coating, or other methods. The solution solvent can be removed, if desired, by heating and/or convection methods.

Examples of suitable carriers, or substrates, are printed circuit boards, plastics, metal and metal alloys, semi-metals, semiconductors, such as Si, Ge, GaAs, glass, ceramics and other inorganic materials, for example, $SiO_2$ and $Si_3N_4$. Further, the substrate can be treated with an adhesion promoter, such as 3-aminopropyl triethoxysilane (APES), or dried (dehydration) to remove moisture on the surface of the substrate before the application of the polyimide coating.

If wet etching techniques are used to make the waveguide, a channel can be etched into the photosensitive polymer of the present invention and then backfilled with a higher refractive index polymer core. In this case, the core material does not have to be photodefinable but could be any low-loss polymer or an electroactive polymer. Alternatively, the core can be a polyimide of the present invention which is etched into a ridge shape and then over coated with any suitable low-loss material with lower refractive index. For example, a core material of the polyimide of the present invention could be overcoated with a low-loss polyimide cladding or a cladding consisting of air, vacuum, glass, etc. Alternatively, other etching methods that can be used with the polyimides of the present invention include reactive ion etching, photo ablation, direct laser writing, and the like.

Other techniques to form waveguides with photosensitive polymers include photolocking (procedure to form holograms), selective diffusion (diffusing a highly absorbing chromphore selectively into lightly cross-linked areas to alter the refractive index), and photobleaching (UV exposure of a chromophore to bleach it out and alter the refractive index).

If channels are prepared using a wet etch procedure, the polyimide coating is shielded with a mask containing a pattern of openings, and the polyimide is exposed to actinic radiation through the openings in the mask. Thus, the polyimide is photochemically altered such that the areas that were exposed to actinic radiation are insoluble. Channels can be created by taking advantage of this selective insolubility to dissolve the soluble polymer and rinse it away with one or more rinses of one or more rinse compositions, thereby leaving a pattern of insoluble polymer. The etching process can also be used to partially remove soluble material from channels to make a ridge or channel type waveguide.

Photocrosslinking is brought about by actinic, or high-energy, radiation, for example, by light within the region of from about 600 nm to about 200 nm or the deep ultraviolet region, or by X-rays, laser light, electron beams, and the like.

The exact composition of the etching composition and the duration for each step of the developing process are generally empirically determined for each polyimide. For example, for a 90:10:50:50 polyimide derived from 6FDA/BTDA/DMDE/BAAF, the mixed-solvent system GBL and xylene is preferred. Other etching compositions that can be used to fully or partially etch the polyimide are propylene carbonate, propylene carbonate/toluene, or GBL/Diglyme. If partial etching is desired, less aggressive etchant compositions should be used.

Etching composition application procedures can include dip-etching and spray-etching. In dip-etching, a substrate is dipped into a container of the etching composition and the polyimide is allowed to dissolve. The polymer effectively dissolves as an infinite dilution. In spray-etching, a mist of etching solution is applied to the surface of a slowly rotating (about 1000 rpm), polyimide-coated substrate. In this manner, fresh etchant is continually delivered to the surface and dissolved polymer is continually being spun off. A particular etching composition may not work equally well in both the dip-etch and spray-etch method. Also, mechanical agitation will affect the outcome of the dip-etch application procedure.

Suitable wet etching (developing) compositions which can be used alone, in combination with another etching composition, or in combination with a suitable rinse composition (see below) include: ethers such as dibutyl ether, tetrahydrofuran, dioxane, methylene glycol, dimethylethylene glycol, dimethyldiethylene glycol, diethyldiethylene glycol, dimethyltrimethylene glycol; halogenated solvents such as methylene chloride, chloroform, 1,2-dichloroethane, 1,1,1-trichloroethane, 1,1,2,2-tetrachloroethane; esters and lactones such as ethyl acetate, 2-methoxyethyl acetate, gamma-butyrolactone; amides and lactams such as N,N-dimethylformamide, N,N-diethylformamide, N,N-dimethylacetamide, N,N-diethylacetamide, N-methylpyrrolidone, N-acetylpyrrolidone; sulfoxides such as dimethylsulfoxide; derivatives of benzenes such as chlorobenzene, nitrobenzene, cresols; ketones such as acetone, methyl ethyl ketone, cyclopentanone, cyclohexanone, and the like. The preferred etching compositions are N,N-dimethylformamide, N,N-dimethylacetamide, N-methylpyrrolidone, gamma-butyrolactone, cyclopentanone, cyclohexanone, propylene carbonate and toluene. The most preferred etching composition is a mixture of propylene carbonate and toluene.

Suitable rinse compositions which can be used alone or in combination include xylenes, toluene, isopropanol, benzene, and the like. The preferred rinse compositions are toluene and isopropanol.

Additional additives that do not destroy the function of the waveguide can be incorporated into the polyimide. For example, chromophores with non-linear optical properties, chrromophores with electro-optic properties, absorbing dyes, particulant fillers, low molecular weight dopants, and the like.

UV irradiation can be followed by wet etch or wet development to form the channel and rib patterns (See Examples 17 and 18). Alternatively, one could use only UV irradiation to form a waveguide using a photolocking or photobleaching method.

The following examples will serve to illustrate certain embodiments of the herein disclosed invention. These examples should not, however, be construed as limiting the scope of the invention as there are many variations which may be made thereon without departing from the spirit of the disclosed invention, as those of skill in the art will recognize.

EXAMPLES

Unless otherwise indicated, the polyimide compositions are mole percent and the etching solutions are volume percent.

All monomers were stored under nitrogen atmosphere.

Inherent Viscosity (IV)

Inherent viscosity for both the polyimide and the polyamic acid was determined from 0.5% w/v solution of the polyimide in NMP at 25° C.

Photosensitivity

Photosensitivity was measured as the incident input energy (or dose) per unit area at a particular polyimide thickness that was required to effect crosslinking. Evidence of crosslinking, therefore, indicated that a particular polymer was photosensitive. In this case, the photosensitivity of the polymer was determined by the exposure dose required to give an essentially insoluble coating when the coating was agitated in xylene/GBL at 25° for approximately 100 seconds.

Refractive Index Measurements

Refractive indices for all of the polymer coatings were made using a Metricon PC-2000 prism coupler modified with a He-Ne (633 nm) and Amoco YAG Microlaser (1064 nm). In plane (TE) and out of plane (TM) refractive indices were determined by using a polarizer to orient the laser light. The TM measurements were performed in the instruments manual mode to improve accuracy.

Birefringence Measurements

The birefringence is the difference between the TE and the TM refractive indices.

Birefringence is a measure of the optical orientation of the polymer film. High birefringence gives high scattering losses and irreproducibility of the refractive index. The lower the birefringence, the better the polymer is for optical applications. Birefringence is measured as a continuous scale with 0.0 being the ideal. Values from about minus 0.25 to about plus 0.25 will provide an acceptable polyimide for use in a waveguide.

EXAMPLE 1

0.9-6FDA/0.1 BTDA 0.5 DMDE/0.5 BAAF

A solution of polyamic acid was prepared at room temperature in which were added 23.474 grams of 2,2'-bis-(3,4-dicarboxyphenyl) hexafluoropropane dianhydride (6FDA), 1.892 grams 3,3'4,4'-benzophenone tetracarboxylic dianhydride (BTDA), 4.822 grams of 2,3,5,6-tetramethyl-1,4-phenylenediamine (DMDE), 9.813 grams of 2,2'-bis(4-aminophenyl) hexafluoropropane (BAAF) and 161.771 grams of N-methylpyrrolidione (NMP) with good mixing to form a polyamic acid (IV 1.5 dl/g). The polyamic acid was chemically imidized at 50° C. by adding 21.82 grams of acetic anhydride, 7.61 grams of pyridine, 16.42 grams of toluene and 13.88 grams of NMP to the polyamic solution with good mixing. The polyimide was precipitated with methyl alcohol using a Waring blender, filtered and washed with additional methyl alcohol and dried in a vacuum oven at 60° C. with a nitrogen purge. The IV of the polyimide precipitate was 1.3 dl/g.

A solution of polyimide in (10% solids in GBL) was cast on a silicon wafer by spin-coating, subjected to a heat treatment up to a maximum temperature of 350° C. to a thickness of 1.9 microns. The refractive index determined by prism coupling was found to be 1.5394 in the TE mode and 1.5251 in the TM mode giving a birefringence of 0.0143. The refractive index is reported in Table I and the birefringence is reported in Table II.

EXAMPLE 2

The polyimide in Example 1 was spin-coated on a silicon wafer to a thickness of 1.9 microns, soft-cured on a hot plate for 3 minutes at 100° C., then exposed using a broad band mercury vapor lamp with energy 10 mW/cm$^2$ at 365 nm for exposure times ranging from 1 second to 50 seconds. The coatings were post-baked for 30 minutes at 175° C. and developed using 50% xylene/50% GBL for 100 seconds. The exposure dose required to obtain an insoluble coating was 100 mJ/cm$^2$. The photosensitivity is reported in Table II.

EXAMPLE 3

0.9-6FDA/0.1 BTDA 0.5 DMDE/0.5 ABL-21

A solution of polyamic acid was prepared in the same manner as Example 1 in which were added 23.718 grams of 6FDA, 1.912 grams of BTDA, 4.872 grams of DMDE, 9.498 grams of 2,2'-bis(trifluoromethyl) benzidine (ABL-21) and 160.725 grams of NMP with good mixing to form a polyamic acid (IV 1.3 dl/g). The polyamic acid was chemically imidized, precipitated and dried in the same manner as Example 1 using 27.17 grams of acetic anhydride, 9.57 grams of pyridine, 20.36 grams of toluene and 17.45 grams of NMP. The IV of the polyimide precipitate was 1.7 dl/g.

A solution of polyimide in (10% solids in GBL) was cast on a silicon wafer by spin-coating, subjected to a heat treatment up to a maximum temperature of 350° C. to a thickness of 3.4 microns. The refractive index was determined in the same manner as in Example 1 and was found to be 1.5594 in the TE mode and 1.5361 in the TM mode giving a birefringence of 0.0233.

EXAMPLE 4

The polyimide in Example 3 was spin-coated on a silicon wafer to a thickness of 3.4 microns, soft-cured, exposed and post-baked as in Example 2. The coatings were developed in 85/15 diglyme/GBL for 100 seconds. The exposure dose required to give an insoluble coating was 50 mJ/cm$^2$.

EXAMPLE 5

0.9-6FDA/0.1 BTDA 0.5 DMDE/0.5 DABF

A solution of polyamic acid was prepared in the same manner as Example 1 in which were added 26.556 grams of 6FDA, 2.140 grams of BTDA, 5.455 grams of DMDE, 5.850 grams of 3,5-diaminobenzotrifluoride (DABF) and 160.893 grms of NMP with good mixing to form a polyamic acid (IV 1.0 dl/g). The polyamic acid was chemically imidized, precipitated and dried in the same manner as Example 1 using 21.46 grams of acetic anhydride, 7.55 grams of pyridine, 16.18 grams of toluene and 13.75 grams of NMP. The IV of the polyimide precipitate was 0.8 dl/g.

A solution of polyimide in (12% solids in GBL) was cast on a silicon wafer by spin-coating, subjected to heat treatment up to a maximum temperature of 350° C. to a thickness 0.9 microns. The refractive index was determined in the same manner as in Example 1 and was found to be 1.5440 in the TE mode and 1.5329 in the TM mode giving a birefringence of 0.0111.

EXAMPLE 6

The polyimide in Example 5 was spin-coated on silicon wafer to thickness of 0.9 microns, soft-cured, exposed and post-baked as in Example 2. The coatings were developed in 63/37 xylene/GBL for 100 seconds. The exposure dose required to obtain an insoluble coating was 300 mJ/cm$^2$.

EXAMPLE 7

0.9-6FDA/0.1 BTDA 0.75 DMDE/0.25 BAAF

A solution of polyamic acid was prepared in the same manner as Example 1 in which were added 25.036 grams of 6FDA, 2.019 grams of BTDA, 7.714 grams DMDE, 5.233 grams BAAF and 160.791 grams of NMP with good mixing to form a polyamic acid (IV 1.6 dl/g). The polyamic acid was chemically imidized, precipitated and dried in the same manner as Example 1 using 26.91 grams acetic anhydride, 9.35 grams pyridine, 19.96 grams toluene and 17.30 grams of NMP. The IV of the polyimide precipitate was 1.6 dl/g.

A solution of polyimide in (10% solids in GBL) was cast of a silicon wafer by spin-coating, subjected to heat treatment up to a maximum temperature of 350° C. to a thickness of 4.9 microns. The refractive index was determined in the same manner as in Example 1 and was found to be 1.5446 in the TE mode and 1.5225 in the TM mode giving a birefringence of 0.0221. Thermal properties were Tg 390° C., TGA (nitrogen) 466° C., and TGA (air) 427° C.

EXAMPLE 8

The polyimide in Example 7 was spin-coated on a silicon wafer to a thickness of 2 microns, soft-cured, exposed and post-baked as in Example 2. The coatings were developed in 50/50 xylene/GBL for 100 seconds. The exposure dose required to give an insoluble coating was 50 mJ/cm$^2$.

EXAMPLE 9

0.9-6FDA/0.1 BTDA 0.75 DMDE/0.25 DABF

A solution of polyamic acid was prepared in the same manner as Example 1 in which were added 26.687 grams of 6FDA, 2.151 grams of BTDA, 8.223 grams DMDE, 2.940 grams DABF and 161.863 grams of NMP with good mixing to form a polyamic acid (IV 1.3 dl/g). The polyamic acid was chemically imidized, precipitated and dried in the same manner as Example 1 using 27.50 grams acetic anhydride, 9.64 grams pyridine, 20.80 grams toluene and 17.66 grams of NMP. The IV of the polyimide precipitate was 1.6 dl/g.

A solution of polyimide in (10% solids in GBL) was cast on a silicon wafer by spin-coating, subjected to heat treatment up to a maximum temperature of 350° C. to a thickness of 4.6 microns. The refractive index was determined in the same manner as in Example 1 and was found to be 1.5524 in the TE mode and 1.5335 in the TM mode giving a birefringence of 0.0189.

EXAMPLE 10

The polyimide in Example 9 was spin-coated on a silicon wafer to a thickness of 4.4 microns, soft-cured, exposed and post-baked as in Example 2. The coatings were developed in 50/50 xylene/GBL for 100 seconds. The exposure dose required to give an insoluble coating was 100 mJ/cm$^2$.

EXAMPLE 11

0.9-6FDA/0.1 BTDA 0.5 TMB/0.5 BAAF

A solution of polyamic acid was prepared in the same manner as Example 1 in which were added 22.232 grams of 6FDA, 1.792 grams of BTDA, 6.682 grams of TMB, 9.294 grams of BAAF and 160.994 grams of NMP with good mixing to form a polyamic acid (IV 1.3 dl/g). The polyamic acid was chemically imidized, precipitated and dried in the same manner as Example 1 using 27.79 grams of acetic anhydride, 9.75 grams of pyridine, 20.60 grams of toluene, and 17.73 grams of NMP. The IV of the polyimide precipitate was 1.1 dl/g.

A solution of polyimide in (12% solids in GBL) was cast on a silicon wafer by spin-coating, subjected to a heat treatment up to a maximum temperature of 350° C. to a thickness of 3.3 microns. The refractive index was determined in the same manner as in Example 1 and was found to be 1.5550 in the TE mode and 1.5362 in the TM mode giving a birefringence of 0.0188.

EXAMPLE 12

The polyimide in Example 11 was spin-coated on a silicon wafer to a thickness of about 4 microns, soft-cured, exposed and post-baked as in Example 2. The exposure dose required to give an insoluble coating was approximately 300 mJ/cm$^2$.

EXAMPLE 13

0.9 - 6FDA/0.1 BTDA 0.5 DMDE/0.5 124-0BABTF

A solution of polyamic acid was prepared in the same manner as Example 1 in which were added 23.440 grams of 6FDA, 1.889 grams of BTDA, 4.816 grams DMDE, 9.856 grams 124-OBABTF and 160.414 grams of NMP with good mixing to form a polyamic acid (1.18 dl/g). The polyamic acid was chemically imidized, precipitated and dried in the same manner as Example 1 using 27.90 grams of acetic anhydride, 9.98 grams pyridine, 20.72 grams toluene, and 17.79 grams of NMP. The IV of the polyimide precipitate was 1.09 dl/g.

A solution of polyimide in (12% solids in GBL) was cast on a silicon wafer by spin-coating, subjected to heat treatment up to a maximum temperature of 350° C. to a thickness of 3.4 microns. The refractive index was determined in the same manner as in Example 1 and was found to be 1.5515 in the TE mode and 1.5379 in the TM mode giving a birefringence of 0.0136.

EXAMPLE 14

The polyimide in Example 13 was spin-coated on a silicon wafer to a thickness of 3.4 microns, soft-cured, exposed and post-baked as in Example 2. The coatings were developed in 50/50 xylene/GBL for 30 seconds. The exposure dose required to give an insoluble coating was approximately 300-400 mJ/cm$^2$.

COMPARATIVE EXAMPLE A 0.5 -6FDA/0.5 BTDA/1.0 DMDE

A solution of polyamic acid was prepared in the same manner as Example 1 in which were added 568.0 grams of 6FDA, 412.0 grams of BTDA, 420.0 grams of DMDE and 5,584.0 grams of NMP with good mixing to form a polyamic acid (IV 0.96 dl/g). The polyamic acid was chemically imidized, precipitated and dried in the same manner as Example 1 using 814.6 grams acetic anhydride, 350.6 grams pyridine, 745.1 grams toluene and 640.6 grams of NMP. The IV of the polyimide precipitate was 0.93 dl/g.

A solution of polyimide in (12% solids in GBL) was cast on a silicon wafer by spin-coating, subjected to heat treatment up to a maximum temperature of 350° C. to a thickness of 3 microns. The refractive index was determined in the same manner as in Example 1 and was found to be 1.6053 in the TE mode and 1.5742 in the TM mode giving a birefringence of 0.0311.

This example demonstrates a polyimide composition that incorporates only DMDE. This composition exhibits high birefringence and scattering losses.

COMPARATIVE EXAMPLE B 0.75 -6FDA/0.25 BTDA/1.0 DMDE

A solution of polyamic acid was prepared in the same manner as Example 1 in which were added 46.012 grams of 6FDA, 11.125 grams of BTDA, 22.683 grams of DMDE and 319.29 grams of NMP with good mixing to form a polyamic acid (IV 1.2 dl/g). The polyamic acid was chemically imidized, precipitated and dried in the same manner as Example 1 using 46.45 grams acetic anhydride, 19.85 grams pyridine, 42.27 grams toluene, and 36.28 grams NMP. The IV of the polyimide precipitate was 1.1 dl/g.

A solution of polyimide in (10-12% solids in GBL) was cast on a silicon wafer by spin-coating, subjected to heat treatment up to a maximum temperature of 350° C. to a thickness of 4.6 microns. The refractive index was determined in the same manner as in Example 1 and was found to be 1.5744 in the TE mode and 1.5452 in the TM mode giving a birefringence of 0.0292.

This example demonstrates a polyimide composition that incorporates only DMDE. This composition exhibits high birefringence and scattering losses.

COMPARATIVE EXAMPLE C 0.9 - 6FDA/0.1 BTDA/1.0 DMDE

A solution of polyamic acid was prepared in the same manner as Example 1 in which were added 26.820 grams of 6FDA, 2.162 grams BTDA, 11.018 grams DMDE and 159.993 grams of NMP with good mixing to form a polyamic acid (IV 1.6 dl/g). The polyamic acid was chemically imidized, precipitated, and dried in the same manner as Example 1 using 20.03 grams of acetic anhydride, 8.69 grams of pyridine, 18.38 grams toluene and 15.81 grams of NMP. The IV of the polyimide precipitate was 1.6 dl/g.

A solution of polyimide in (7-10% solids in GBL) was cast on a silicon wafer by spin-coating, subjected to heat treatment up to a maximum temperature of 350° C. to a thickness of 3.5 microns. The refractive index was determined in the same manner as in Example 1 and was found to be 1.5456 in the TE mode and 1.5175 in the TM mode giving a birefringence of 0.0281.

This example demonstrates a polyimide composition that incorporates only DMDE. This composition exhibits high birefringence and scattering losses.

COMPARATIVE EXAMPLE D

0.9 - 6FDA/0.1 BTDA

0.5 DMDE/0.5 OBA

A solution of polyamic acid was prepared in the same manner as Example 1 in which were added 26.034 grams of 6FDA, 2.098 grams BTDA, 5.348 grams DMDE, 6.519 grams OBA and 161.177 grams of NMP with good mixing to form a polyamic acid (IV 1.7 dl/g). The polyamic acid was chemically imidized, precipitated, and dried in the same manner as Example 1 using 35.18 grams acetic anhydride, 12.30 grams pyridine, 26.08 grams toluene, and 22.41 grams of NMP. The IV of the polyimide precipitate was 1.7 dl/g.

A solution of polyimide in (10% solids in GBL) was cast on a silicon wafer by spin-coating, subjected to heat treatment up to a maximum temperature of 350° C. to a thickness of 3.4 microns. The refractive index was determined in the same manner as in Example 1 and was found to be 1.5913 in the TE mode and 1.5789 in the TM mode giving a birefringence of 0.0124.

The polyimide in Comparative Example D was spin-coated on a silicon wafer to a thickness of 4.0 microns, soft-cured, exposed and post-baked as in Example 2. The coatings were developed in 50/50 xylene/GBL for 100 seconds. Even at exposure doses greater than 6000 mJ/cm$^2$, an insoluble coating was not obtained.

This example demonstrates a polyimide composition which incorporates an aryl ether diamine in the form of OBA. This composition was found to be not sufficiently photosensitive to provide a photolithographically useful image.

COMPARATIVE EXAMPLE E

0.9 - 6FDA/0.1 BTDA

0.5 DMDE/0.5 APBP

A solution of polyamic acid was prepared in the same manner as Example 1 in which were added 22.900 grams 6FDA, 1.846 grams BTDA, 4.704 grams DMDE, 10.551 grams APBP and 160.153 grams NMP with good mixing to form a polyamic acid (2.0 dl/g). The polyamic acid was chemically imidized, precipitated and dried in the same manner as Example 1 using 49.53 grams acetic anhydride, 17.26 grams pyridine, 36.70 grams toluene, and 31.64 grams of NMP. The IV of the polyimide precipitate was 1.8 dl/g.

A solution of polyimide in (7% solids in GBL) was cast on a silicon wafer by spin-coating, subjected to heat treatment up to a maximum temperature of 350° C. to a thickness of 4.4 microns. The refractive index was determined in the same manner as in Example 1 and was found to be 1.5878 in the TE mode and 1.5673 in the TM mode giving a birefringence of 0.0205.

The polyimide in Comparative Example E was spin-coated on a silicon wafer to a thickness of approximately 1 micron, soft-cured, exposed, and post-baked as in Example 2. The coating were developed in 50/50 xylene/GBL for 100 seconds. Even at exposure doses greater than 6000 mJ/cm$^2$, an insoluble coating was not obtained.

This example demonstrates a polyimide composition which incorporates an aryl ether diamine in the form of APBP. This composition was found to be not sufficiently photosensitive to provide a photolithographically useful image.

COMPARATIVE EXAMPLE F

0.9 - 6FDA/0.1 BTDA

0.5 DMDE/0.5 BDAF

A solution of polyamic acid was prepared in the same manner as Example 1 in which were added 20.678 grams of 6FDA, 1.667 grams of BTDA, 4.248 grams DMDE, 13.407 grams BDAF and 160.252 grams of NMP with good mixing to form a polyamic acid (IV 1.8 dl/g). The polyamic acid was chemically imidized, precipitated, and dried in the same manner as Example 1 using 54.16 grams acetic anhydride, 18.97 grams pyridine, 40.60 grams toluene, and 34.79 grams of NMP. The IV of the polyimide precipitate was 1.2 dl/g.

A solution of polyimide in (10–12% solids in GBL) was cast on a silicon wafer by spin-coating, subjected to heat treatment up to a maximum temperature of 350° C. to a thickness of 2.6 microns. The refractive index was determined in the same manner as in Example 1 and was found to be 1.5698 in the TE mode and 1.5627 in the TM mode giving a birefringence of 0.0071.

The polyimide in Comparative Example F was spin-coated on a silicon wafer to a thickness of approximately 1 micron, soft-cured, exposed and post-baked as in Example 2. The coatings were developed in 50/50 xylene/GBL for 100 seconds. Even at exposure doses greater than 6000 mJ/cm$^2$, an insoluble coating was not obtained.

This example demonstrates a polyimide composition which incorporates an aryl ether diamine in the form of BDAF. This composition was found to be not sufficiently photosensitive to provide a photolithographically useful image.

COMPARATIVE EXAMPLE G

0.9 - 6FDA/0.1 BTDA

0.6 DMDE/0.4 FAPB

A solution of polyamic acid was prepared in the same manner as Example 1 in which were added 21.788 grams of 6FDA, 1.756 grams of BTDA, 5.461 grams of DMDE, 10.996 grams of FAPB and 160.336 grams NMP with good mixing to form a polyamic acid (IV 1.0 dl/g). The polyamic acid was chemically imidized, precipitated and dried in the same manner as Example 1 using 26.66 grams of acetic anhydride, 9.39 grams pyridine, 19.77 grams toluene, and 16.99 grams of NMP. The IV of the polyimide precipitate was 1.0 dl/g.

A solution of polyimide in (12% solids in GBL) was cast on a silicon wafer by spin-coating, subjected to heat treatment up to a maximum temperature of 350° C. to a thickness of 3.7 microns. The refractive index was determined in the same manner as in Example 1 and was found to be 1.5626 in the TE mode and 1.5462 in the TM mode giving a birefringence of 0.0164.

The polyimide in Comparative Example G was spin-coated on a silicon wafer to a thickness of 3.0 microns, soft-cured, exposed and post-baked as in Example 2. The coatings were developed in 50/50 xylene/GBL for 100 seconds. Even at exposure doses greater than 3000 mJ/cm$^2$, an insoluble coating was not obtained.

This example demonstrates a polyimide composition which incorporates an aryl ether diamine in the form of FAPB. This composition was found to be not sufficiently photosensitive to provide a photolithographically useful image.

TABLE I

| EXAMPLE | TE MODE* | TM MODE* |
|---|---|---|
| 1 | 1.5394 | 1.5251 |
| 3 | 1.5594 | 1.5361 |
| 5 | 1.5440 | 1.5329 |
| 7 | 1.5446 | 1.5225 |
| 9 | 1.5524 | 1.5335 |
| 11 | 1.5550 | 1.5362 |
| 13 | 1.5515 | 1.5379 |
| 14 | 1.5515 | 1.5379 |

*refractive index

The refractive index can be controlled by changing the composition of the polyimide (for example, compare Example 1 to Example 7) or by substituting one co-diamine for another (compare Example 1 to Example 3).

TABLE II

| EXAMPLE NUMBER | COMPOSITION | PHOTOSENSITIVITY GEL DOSE (mJ/cm$^2$) | BIRE-FRINGENCE |
|---|---|---|---|
| A | 0.5-6FDA/0.5 BTDA 1.0 DMDE | 50 | 0.0311 |
| B | 0.75-6FDA/0.25 BTDA 1.0 DMDE | 50 | 0.0292 |
| C | 0.9-6FDA/0.1 BTDA/1.0 DMDE | 70 | 0.0281 |
| 1-2 | 0.9-6FDA/0.1 BTDA 0.5 DMDE/0.5 BAAF | 100 | 0.0143 |
| 3-4 | 0.9-6FDA/0.1 BTDA 0.5 BMDE/0.5 ABL-21 | 50 | 0.0233 |
| 5-6 | 0.9-6FDA/0.1 BTDA 0.5 DMDE/0.5 DABF | 300 | 0.0111 |
| 7-8 | 0.9-6FDA/0.1 BTDA 0.75 DMDE/0.25 BAAF | 50 | 0.0221 |
| 9-10 | 0.9-6FDA/0.1 BTDA 0.75 DMDE/0.25 DABF | 100 | 0.0189 |
| 11-12 | 0.9-6FDA/0.1 BTDA 0.5 TMB/0.5 BAAF | 300 | 0.0188 |
| 13-14 | 0.9-6FDA/0.1 BTDA 0.5 DMDE/0.5 124-OBABTF | 300-400 | 0.0136 |
| D | 0.9-6FDA/0.1 BTDA 0.5 DMDE/0.5 OBA | >6000 | 0.0124 |
| E | 0.9-6FDA/0.1 BTDA 0.5 DMDE/0.5 APBP | >6000 | 0.0205 |
| F | 0.9-6FDA/0.1 BTDA 0.5 DMDE/0.5 BDAF | >6000 | 0.0071 |
| G | 0.9-6FDA/0.1 BTDA 0.6 DMDE/0.4 FAPB | >3000 | 0.0164 |

Birefringence is a measure of the optical orientation of the polymer film. High birefringence gives high scattering losses and irreproducibility of the refractive index. The lower the birefringence, the better the polymer is for optical waveguide applications. Birefringence is measured as a continuous scale with 0.0 being the ideal. A suitable birefringence range is from about minus 0.25 to about plus 0.25, with zero being the most preferred.

As can be seen from Table II, the presence of the co-diamine provides a polyimide that is suitable for use in an optical waveguide (see Examples 1-14). However, Comparative Examples A-C were prepared without the co-diamine and are not suitable because the birefringence is higher.

Also, as can be seen from Table II, although the aryl ether diamine containing polyimides were effective in reducing birefringence, they increased the photosensitivity value to greater than 1,000 mJ/cm$^2$. Therefore, the aryl ether diamines are not useful as co-diamines in the present invention.

Again referring to Table II, the photosensitivity (measured by gel dose) should be low enough to produce a lithographically useful image using standard lithography equipment. The lowest gel dose would be zero. Typically, 1000 mJ/cm$^2$ is required to provide a useful image. Preferably, the gel dose is less than 300 mJ/cm$^2$ so that the exposure times can be shorter. Generally, polyimides having higher birefringence measurements have decreased optical transparency.

EXAMPLE 15

A solution of the polyimide in Example 7 was spin-coated on an oxide coated silicon wafer and subjected to a heat treatment of 175° C. for 1 hour and 350° C. for 1 hour. The resultant waveguide has a polyimide core and silicon dioxide as the lower cladding and air as the upper cladding. The optical loss was measured by guided streak image analysis with light at a wavelength of 830 nm. The optical loss was found to be 1.2 dB/cm.

EXAMPLE 16

A solution of the polyimide in Example 7 was spin-coated on a adhesion promoter (APES) treated silicon wafer to a thickness of 5 microns and then subjected to the cure cycle as in Example 15. A solution of the polyimide in Example 3 was then spin-coated to a thickness of 3 microns to form a second layer and subjected to a cure cycle of 175° C. for 1 hour and 350° C. for 1 hour. A solution of polyimide in Example 7 was then spin-coated to a thickness of 5 microns and subjected to a cure cycle of 175° C. for 1 hour and 350° C. for 1 hour. The resultant three layer waveguide has a core of the polyimide of Example 3, a lower cladding of the polyimide of Example 7 and an upper cladding of the polyimide of Example 7. The optical loss was measured by end fire coupling into the edge of the waveguide and measuring the attenuation by guided streak image analysis. The optical loss was found to be 1.2 dB/cm.

EXAMPLE 17

A solution of the polyimide in Example 7 was spin-coated on an adhesion promoter treated silicon wafer to a thickness of 3 microns and then soft-cured on a hot plate for 3 minutes at 100° C. The coating was then exposed to UV light through a photomask with a channel waveguide pattern using an exposure dose of 300 mJ/cm². The coating was baked in the oven at 175° C. for 30 minutes and then spray developed on the spin-coater using a mixture of 25/75 GBL/Xylene for 100 seconds to etch out channels. Channel dimensions were 5 microns wide, 2 microns deep, and 2 cm long. The etched coating was cured at 350° C. for 1 hour. This channel can then be backfilled by spin-coating a higher refractive index polyimide core to form a patterned waveguide.

EXAMPLE 18

The coating of Example 17 (soft cured) was exposed to UV light through a photomask with a rib waveguide pattern using a exposure dose of 300 mJ/cm². The coating was then baked as described above and spray developed on the spin-coater using a 90/10 mixture of propylene carbonate/toluene for 30 secs to form a rib pattern. The dimensions of the ribs were 5 microns wide, 2 microns high, and 2 cm long. The etched coating was cured at 350° C. for 1 hour. The ribs can then be overcoated with a lower refractive index cladding such as polyimide, or air can be used as the cladding to form a patterned waveguide.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

That which is claimed is:

1. A photodefinable optical waveguide comprising a core material within a cladding material wherein at least one of the core material and the cladding material comprises a copolyimide having the repeating units

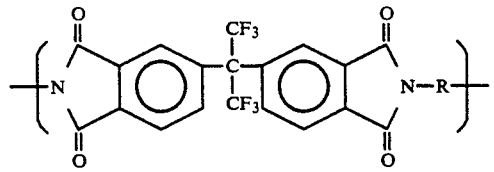

and from about 0.1 mole % to about 30 mole %

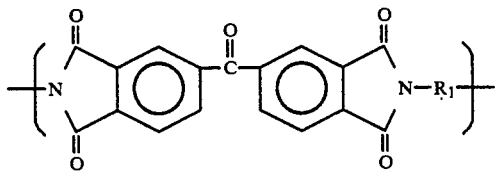

wherein R and $R_1$ are selected from a group consisting of at least one of an aromatic diamine moiety having bulky methyl groups ortho to the amine, and a co-diamine moiety; or the polyamic acid, salts, or polyester precursors therefor; wherein the photosensitivity of the polyimide is less than about 1,000 mJ/cm², the birefringence is from about minus 0.25 to about plus 0.25, and wherein the refractive index of the core is greater than the cladding.

2. The photodefinable optical waveguide of claim 1 wherein the photosensitivity of the polyimide is less than about 300 mJ/cm².

3. The photodefinable optical waveguide of claim 1 wherein the aromatic diamine moiety having bulky methyl groups ortho to the amine is selected from the group consisting of

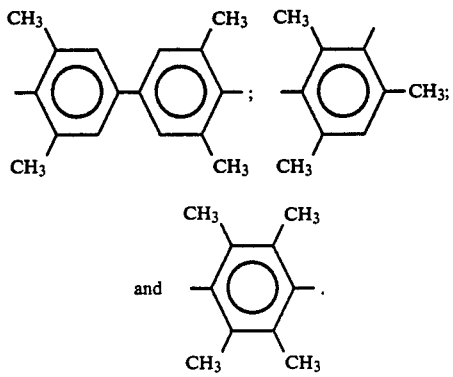

4. The photodefinable optical waveguide of claim 3 wherein the aromatic diamine moiety having bulky methyl groups ortho to the amine is

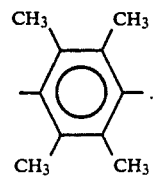

5. The photodefinable optical waveguide of claim 1 wherein the co-diamine moiety disrupts the in-plane packing and the orientation of the polyimide.

6. The photodefinable optical waveguide of claim 1 wherein the co-diamine moiety is selected from the group consisting of ABL-21, DABF, and BAAF.

7. The photodefinable optical waveguide of claim 1 wherein the core material is selected from the group consisting of a polymer, $SiO_2$, epoxy, and glass.

8. The photodefinable optical waveguide of claim 1 wherein the core is the reaction product of 6FDA, BTDA, DMDE, and a co-diamine moiety selected from the group consisting of ABL-21, DABF, and BAAF.

9. The photodefinable optical waveguide of claim 1 wherein the cladding is the reaction product of 6FDA, BTDA, DMDE, and a co-diamine moiety selected from the group consisting of ABL-21, DABF, and BAAF.

10. The photodefinable optical waveguide of claim 1 wherein the cladding is selected from the group consisting of a polymer, air, vacuum, glass, $SiO_2$, silicone gel, epoxy, and PMMA.

11. The photodefinable optical waveguide of claim 1 wherein both the core material and the cladding material are the copolyimide of claim 1 and wherein the refractive index of the core is greater than the cladding.

12. The photodefinable optical waveguide of claim 1 wherein the cladding material is the copolyimide of claim 1 which is etched into channels and which is overcoated with a core material having a higher refractive index than the cladding.

13. The photodefinable optical waveguide of claim 1 wherein the core material is the copolyimide of claim 1 which is etched into ribs and which is overcoated with a cladding material having a lower refractive index than the core.

14. The photodefinable optical waveguide of claim 1 wherein the co-diamine is substituted with fluorine groups.

* * * * *